US008630006B2

(12) United States Patent
Kouno

(10) Patent No.: US 8,630,006 B2
(45) Date of Patent: Jan. 14, 2014

(54) IMAGE PROCESSING SYSTEM, INFORMATION PROCESSING DEVICE, NON-TRANSITORY COMPUTER READABLE MEDIUM, AND JOB EXECUTION METHOD

(75) Inventor: Takahiro Kouno, Amagasaki (JP)

(73) Assignee: Konica Minolta Business Technologies, Inc., Chiyoda-Ku, Tokyo (JP)

(*) Notice: Subject to any disclaimer, the term of this patent is extended or adjusted under 35 U.S.C. 154(b) by 199 days.

(21) Appl. No.: 13/035,078

(22) Filed: Feb. 25, 2011

(65) Prior Publication Data
US 2011/0216357 A1 Sep. 8, 2011

(30) Foreign Application Priority Data
Mar. 3, 2010 (JP) ................................. 2010-046578

(51) Int. Cl.
G06F 15/00 (2006.01)
(52) U.S. Cl.
USPC ................................. 358/1.15; 358/1.9; 726/5
(58) Field of Classification Search
None
See application file for complete search history.

(56) References Cited

U.S. PATENT DOCUMENTS

| 5,761,309 A | 6/1998 | Ohashi et al. |
| 2002/0150253 A1 | 10/2002 | Brezak et al. |
| 2003/0018913 A1 | 1/2003 | Brezak et al. |
| 2003/0070068 A1 | 4/2003 | Medvinsky |
| 2005/0015585 A1 | 1/2005 | Kurose |
| 2007/0008577 A1* | 1/2007 | Matsuura et al. ............ 358/1.15 |
| 2007/0113089 A1 | 5/2007 | Yami et al. |
| 2008/0092215 A1* | 4/2008 | Soukup et al. ............... 726/5 |
| 2008/0104675 A1 | 5/2008 | Kusano et al. |
| 2008/0180704 A1* | 7/2008 | Kametani ..................... 358/1.9 |

FOREIGN PATENT DOCUMENTS

| JP | 2003-030150 A | 1/2003 |
| JP | 2003-099401 A | 4/2003 |
| JP | 2003-345753 A | 12/2003 |
| JP | 2004-287912 A | 10/2004 |
| JP | 2005-018748 A | 1/2005 |
| JP | 2005-018749 A | 1/2005 |
| JP | 2005-505991 A | 2/2005 |
| JP | 2007-110351 A | 4/2007 |
| JP | 2007-141230 A | 6/2007 |
| JP | 2008-117069 A | 5/2008 |
| WO | WO 96/07256 A1 | 3/1996 |

OTHER PUBLICATIONS

Office Action dated Mar. 6, 2012, issued in corresponding Japanese Patent Application No. 2010-046578, and an English Translation thereof. (7 pages).

* cited by examiner

Primary Examiner — Twyler Haskins
Assistant Examiner — Helen Q Zong
(74) Attorney, Agent, or Firm — Buchanan Ingersoll & Rooney PC

(57) ABSTRACT

An image processing system comprises a job cooperation server for executing a predetermined processing necessary for execution of a job; an image processing device for cooperating with the job cooperation server and executing the job; an authentication server for executing user authentication and issuing an underlying ticket corresponding to a user and for issuing a ticket to use the job cooperation server based on the underlying ticket; and an information processing device for acquiring and storing the underlying ticket by sending a request for authentication to the authentication server and for acquiring the ticket to use the job cooperation server from the authentication server with the underlying ticket. The information processing device acquires the ticket to use the job cooperation server from the authentication server with the underlying ticket and transmits to the image processing device. The image processing device executes the job through cooperation with the job cooperation server.

8 Claims, 10 Drawing Sheets

IMAGE PROCESSING SYSTEM 1

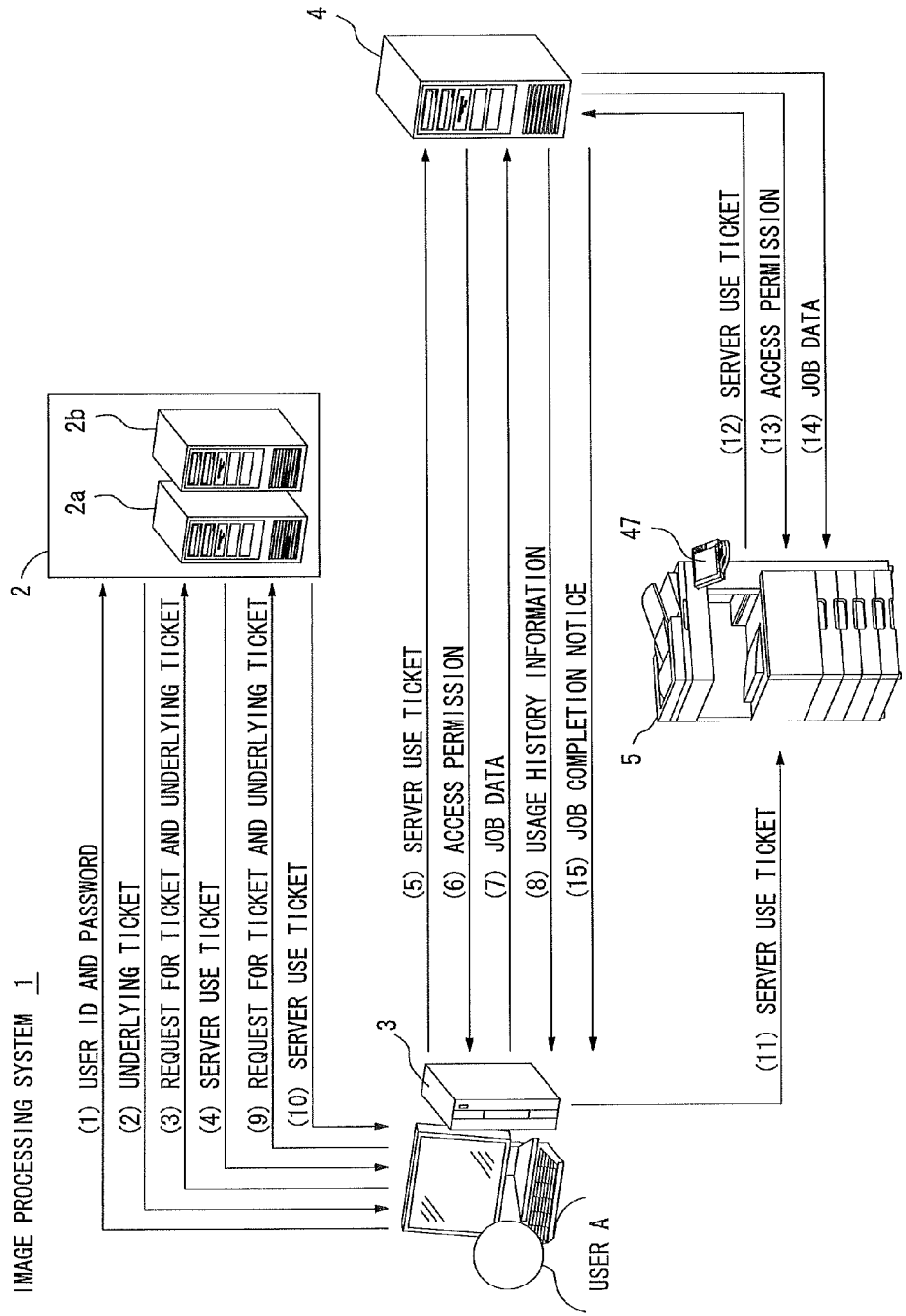

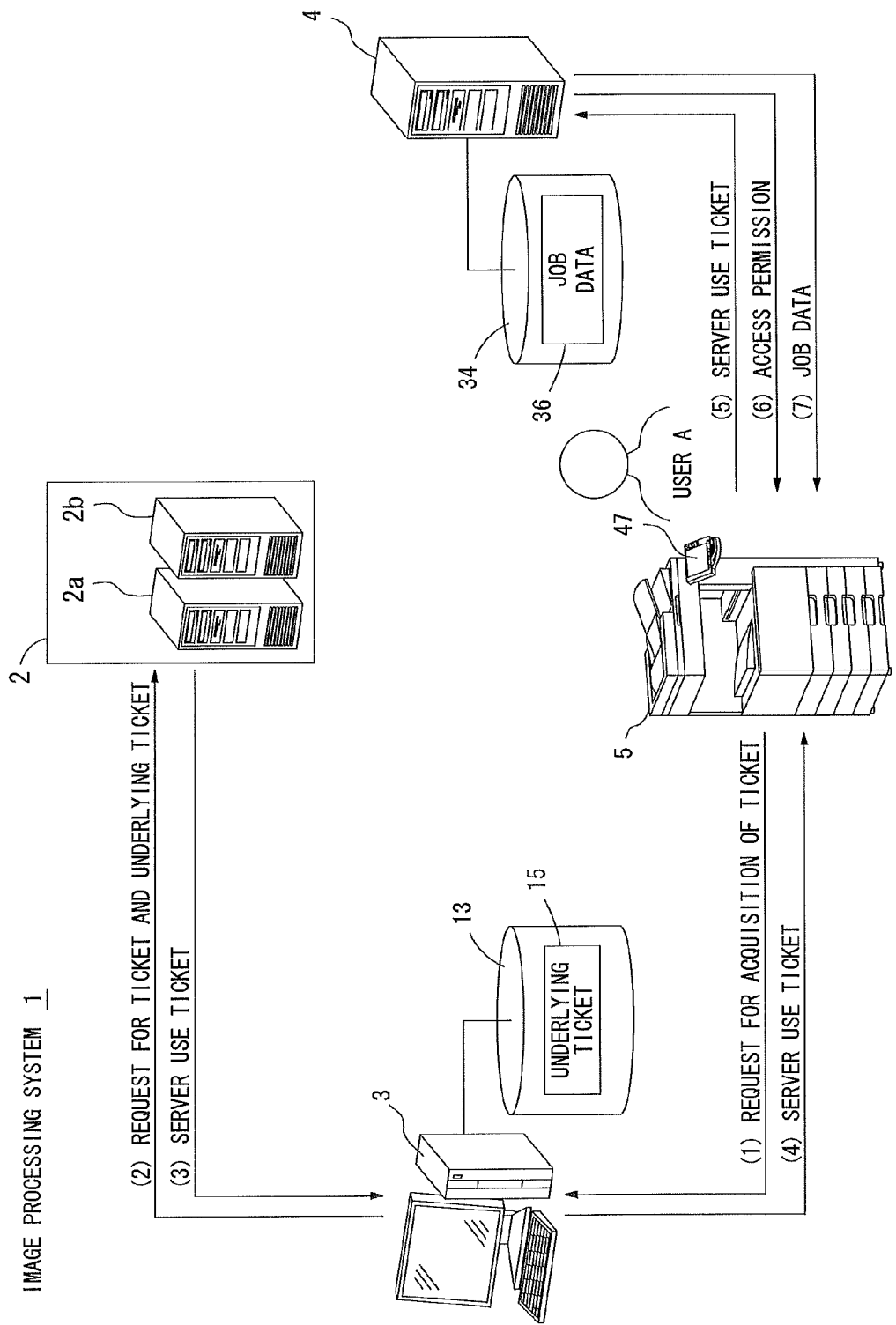

IMAGE PROCESSING SYSTEM, INFORMATION PROCESSING DEVICE, NON-TRANSITORY COMPUTER READABLE MEDIUM, AND JOB EXECUTION METHOD

This application is based on the application No. 2010-046578 filed in Japan, the contents of which are hereby incorporated by reference.

BACKGROUND OF THE INVENTION

1. Field of the Invention

The present invention relates to an image processing system, an information processing device, a computer readable medium, and a job execution method. The present invention more specifically relates to a technique of executing a job through cooperation between an image processing device and a job cooperation server by using a ticket issued by an authentication server.

2. Description of the Background Art

Recently, image processing devices called as digital complex devices or MFPs (multi function peripherals) installed in places such as an office have been connected to a network. Devices such as a computer and a server providing various functions besides the image processing devices are also connected to the network. There are many types of servers such as an authentication server for authenticating a user and a job cooperation server for cooperating with the image processing device and executing a job.

Ticket type single sign-on system using Kerberos authentication is known as a recent network system. In this system, as a user makes operation to the image processing device and enters authentication information such as user ID and password, a request for authentication is sent to the authentication server from the image processing device. User authentication is then executed in the authentication server. As the user authentication results in success, an underlying ticket (TGT: Ticket Granting Ticket) corresponding to the user is transmitted from the authentication server to the image processing device. The underlying ticket thereby transmitted is stored in the image processing device. When the image processing device executes a job through cooperation with the job cooperation server based on instructions by the user, it transmits the underlying ticket to the authentication server, and sends a request for a ticket to use the job cooperation server. Based on the request, the authentication server transmits the ticket to use the job cooperation server to the image processing device. The image processing device accesses the job cooperation server with the ticket. As a result, the image processing device is allowed to execute the job through cooperation with the job cooperation server.

In the above-described system, whether or not each user is authorized to use the job cooperation server is determined based on the underlying ticket issued in advance by the authentication server. If the user is authorized to use the job cooperation server, the ticket to use the job cooperation server is issued based on the underlying ticket. When each user makes operation to give instructions to the image processing device to access the job cooperation server, he or she is not required to enter information such as his or her user ID and password every time. Regarding this point, operability is good.

The user operates the image processing device and tries to execute the job through cooperation between the image processing device and the job cooperation server. At the timing, the image processing device starts operation to acquire the ticket to use the job cooperation server from the authentication server in the above-described system. So, there is a problem that it takes time to start execution of the job in the image processing device.

The image processing device installed in places such as an office is used by the plurality of users. Moreover, the user who uses is replaced by another frequently. For initial use of the image processing device by each of the users, the image processing device acquires the underlying ticket corresponding to the user from the authentication server and stores therein the acquired underlying ticket. The underlying ticket stored in the image processing device is possible to be used by a third person improperly, causing lowering of security.

The underlying ticket may be deleted every time the user replaced. In such a case, the image processing device needs to execute a process to prompt entry of information such as user ID and password and to send the request for authentication to the authentication server every time the user replaced. When the same user uses the image processing device very often repeatedly, he or she is required to make entry of user ID and password each time. The operability is lowered. Also in this case, the request for authentication is sent to the authentication server every time the user of the image processing device replaced, so a load placed on the authentication server is got heavier. Especially when multiple image processing devices are installed in a network environment and the authentication server unifies the management of those multiple image processing devices, the load placed on the authentication server is got extremely heavy.

In order to reduce the operation load placed on the user enters user ID and password, the underlying ticket acquired from the authentication server is stored in a removable medium. This known technique is introduced for example in Japanese Patent Application Laid-Open No. 2007-110351 A. According to this technique, by attaching the removable medium to the image processing device, the user may use the underlying ticket stored in the removable medium. The user is allowed to skip the operation to make entry of user ID and password.

In the above-described conventional technique, however, it is less convenient for the user to carry the removable medium stores therein the underling ticket around all the time to use the image processing device. Also, after using the image processing device, the user may leave the image processing device without removing the removable medium. In this case, the underlying ticket is possible to be used by a third person improperly. Even when the underlying ticket is stored in the removable medium, the image processing device is required to start a process when accessing the job cooperation server. The process is to transmit the underlying ticket to the authentication server after the removable medium is attached, and to acquire the ticket to use the job cooperation server. So, it still takes time to start execution of the job.

SUMMARY OF THE INVENTION

The present invention is intended to solve the problems described above. Thus, the present invention is intended to provide an image processing system, an information processing device, a computer readable medium and a job execution method capable of reducing a load placed on an authentication server without remaining an underlying ticket in the image processing device, and capable of rapidly starting execution of a job through cooperation between the image processing device and a job cooperation device, thereby improving security and convenience of the image processing device.

First, the present invention is directed to an image processing system.

According to one aspect of the image processing system, the image processing system comprises: a job cooperation server for executing a predetermined processing for execution of a job; an image processing device for cooperating with the job cooperation server and executing the job; an authentication server for executing user authentication and issuing an underlying ticket corresponding to a user and for issuing a ticket to use the job cooperation server based on the underlying ticket; and an information processing device for acquiring and storing the underlying ticket by sending a request for authentication to the authentication server based on authentication information entered by the user and for acquiring the ticket to use the job cooperation server from the authentication server with the underlying ticket. The information processing device acquires the ticket for the image processing device to use the job cooperation server from the authentication server with the underlying ticket and transmits to the image processing device. The image processing device accesses the job cooperation server with the ticket acquired from the information processing device and executes the job through cooperation with the job cooperation server.

Second, the present invention is directed to an information processing device connected with each of a job cooperation server for executing a predetermined processing for execution of a job, an image processing device for cooperating with the job cooperation server and executing the job and an authentication server for executing user authentication and issuing an underlying ticket corresponding to a user and for issuing a ticket to use the job cooperation server based on the underlying ticket through a network.

According to one aspect of the information processing device, the information processing device comprises: an underlying ticket acquisition part for acquiring the underlying ticket from the authentication server by sending a request for authentication attaching authentication information to the authentication server; a storage part for storing therein the underlying ticket acquired by the underlying ticket acquisition part; a use ticket acquisition part for acquiring the ticket for the image processing device to use the job cooperation server from the authentication server by transmitting the underlying ticket stored in the storage part to the authentication server; and a ticket transmission part for making the job cooperation server available for the image processing device by transmitting the ticket acquired by the use ticket acquisition part to said image processing device.

Third, the present invention is directed to a computer readable medium on which a program is stored. The program is to be executed by an information processing device with which each of a job cooperation server for executing a predetermined processing necessary for execution of a job, an image processing device for cooperating with the job cooperation server and executing the job and an authentication server for executing user authentication and issuing an underlying ticket corresponding to a user and for issuing a ticket to use the job cooperation server based on the underlying ticket is connected through a network.

According to one aspect of the program, the program causes the computer to execute processing comprising the steps of: (a) acquiring said underlying ticket from the authentication server by sending a request for authentication attaching authentication information to the authentication server; (b) storing the underlying ticket acquired in the step (a) in a predetermined storage part; (c) acquiring the ticket for said image processing device to use the job cooperation server from the authentication server by transmitting the underlying ticket stored in the storage part to the authentication server; and (d) making the job cooperation server available for the image processing device by transmitting the ticket acquired in the step (c) to the image processing device.

Forth, the present invention is directed to a job execution method employed in an image processing system comprising a job cooperation server for executing a predetermined processing necessary for execution of a job, an image processing device for cooperating with the job cooperation server and executing the job, an authentication server for executing user authentication and issuing an underlying ticket corresponding to a user and for issuing a ticket to use the job cooperation server based on the underlying ticket and an information processing device for acquiring the ticket to use the job cooperation server from the authentication server, each of which connected through a network.

According to one aspect of the method, the method comprises the steps of: (a) acquiring and storing the underlying ticket from the authentication server with sending of a request for authentication attaching authentication information to the authentication server by the information processing device; (b) sending a request for issuance of the ticket for the image processing device to use the job cooperation server with the underlying ticket from the information processing device to the authentication server; (c) transmitting the ticket for the image processing device to use the job cooperation server from the authentication server to the information processing device based on the request for issuance of ticket; (d) transmitting the ticket acquired from the authentication server to the image processing device by the information processing device, respectively; (e) storing the ticket received by the image processing device in a predetermined storage part; and (f) accessing the job cooperation server by the image processing device with the ticket stored in the storage part, and executing the job through cooperation with the job cooperation server.

BRIEF DESCRIPTION OF THE DRAWINGS

FIG. 9 shows a flow of data communication in the image processing system; and

FIG. 10 shows another flow of data communication in the image processing system.

DESCRIPTION OF THE PREFERRED EMBODIMENTS

Figure 1:
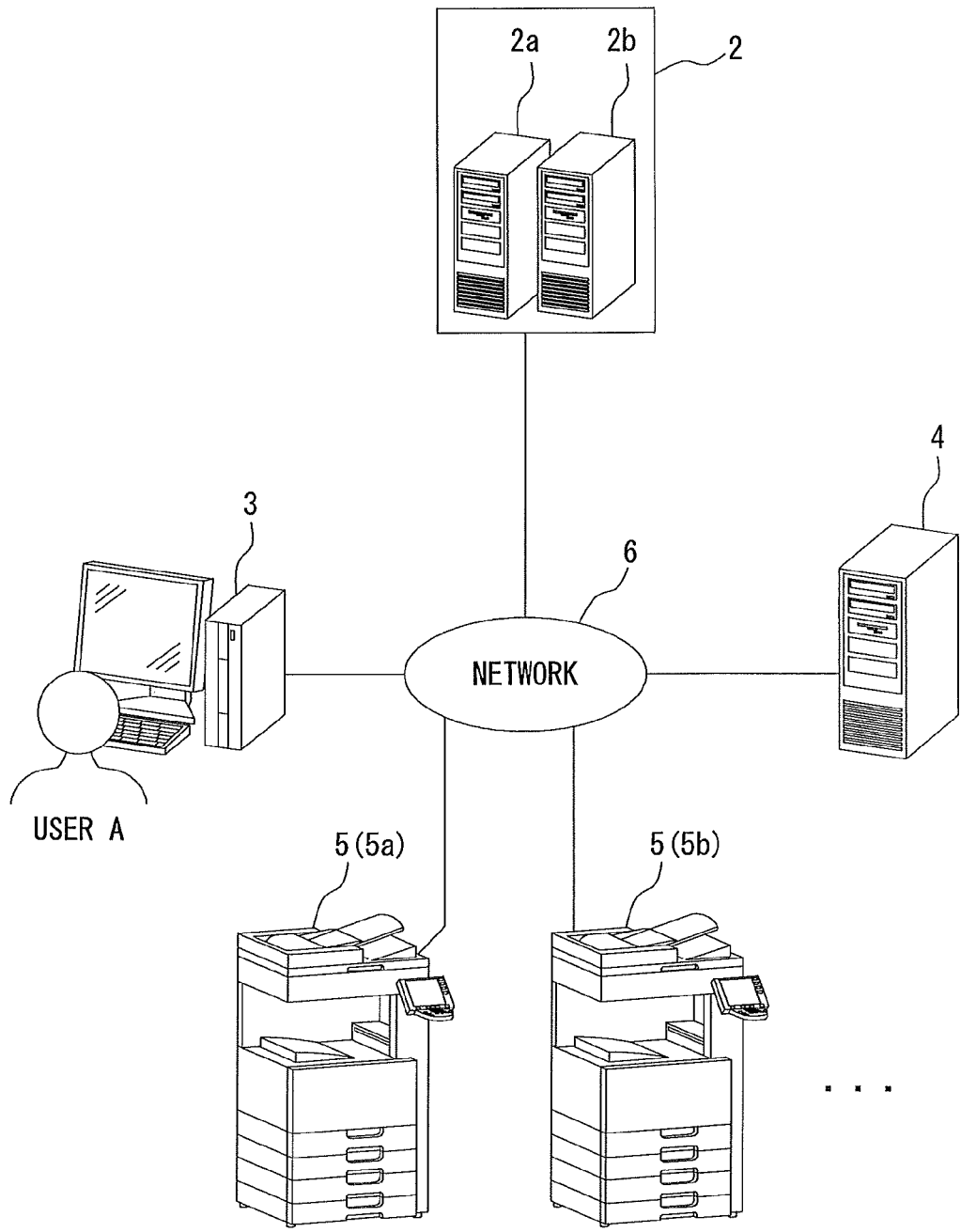
FIG. 1 shows an exemplary configuration of an image processing system.

Preferred embodiment of the present invention is described in detail below with reference to figures. In the description given below, those elements which are shared in common among the preferred embodiments are represented by the same reference numerals, and these elements are not discussed repeatedly for the same description.

FIG. 1 shows an exemplary configuration of an image processing system 1 to which the present invention is applied. The image processing system 1 comprises an authentication server 2, an information processing device 3, a job cooperation server 4 and multiple image processing devices 5 (5a and 5b) connected to a network 6. The network 6 is a network such as LAN (Local Area Network). The authentication server 2, the information processing device 3, the job cooperation server 4 and the image processing devices 5 are connected, so that data communication with each other through the network 6 is enabled. In FIG. 1, two image processing devices 5 are connected to the network 6. The number of the image processing devices 5 is not limited to two. More than three image processing devices 5 or only one image processing device 5 may be connected. The number of each information processing device 3 and job cooperation server 4 is not limited to one either. More than one information processing device 3 and the job cooperation server 4 may be connected to the network 6.

The authentication server 2 is responsible for Kerberos authentication, and is also called as KDC (Key Distribution Center). The authentication server 2 unifies the management of information relating to at least one user who uses the network 6. The authentication server 2 includes an authentication device 2a and a ticket issuance device 2b. The authentication device 2a executes user authentication of the user who uses the network 6 and issues an underlying ticket (such as TGT: Ticket Granting Ticket) corresponding to the authenticated user. The ticket issuance device 2b issues a ticket to use the job cooperation server 4 based on the underlying ticket. The underlying ticket is a basic ticket necessary for issuance of the ticket to use the job cooperation server 4 in the ticket issuance device 2b. The ticket to use the job cooperation server 4 is a unique ticket issued for use of the job cooperation server 4. When, for example, multiple job cooperation servers 4 are connected to the network 6, the different ticket is issued for each job cooperation server 4, respectively. The image processing system 1 is so configured, with the function of the authentication server 2, as a ticket type single sign on system using the Kerberos authentication.

The image processing device 5 is also called as a digital complex device or an MFP (multi function peripheral) having several functions such as a copy function, a fax function, a printer function and a scanner function. The image processing device 5 executes a job relating to each function. The image processing device 5 is capable of executing a job through cooperation with the job cooperation server 4.

The job cooperation server 4 executes a predetermined process required for execution of the job in the image processing device 5. In the preferred embodiment, the job cooperation server 4 functions as a pull print server. Specifically, as receiving job data from the information processing device 3 through the network 6, the job cooperation server 4 stores the received job data in a storage device 34 described later. If a request for access to the job data is received from the image processing device 5, the job cooperation server 4 reads the job data from the storage device 34 and transmits the read job data to the image processing device 5.

In the preferred embodiment, in order to access the job cooperation server 4 through the network 6, each of the information processing device 3 and the image processing device 5 needs to transmit the ticket to use the job cooperation server 4 to the job cooperation server 4 and gain an access permission from the job cooperation server 4. Before transmitting the job data to the job cooperation server 4, the information processing device 3 acquires the ticket to use the job cooperation server 4 issued by the authentication server 2. With transmission of the acquired ticket to the job cooperation server 4, the information processing device 3 gains the access permission from the job cooperation server 4. Also, before acquiring the job data stored in the job cooperation server 4, the image processing device 5 acquires the ticket to use the job cooperation server 4 issued by the authentication server 2. The image processing device 5 then transmits the acquired ticket to the job cooperation server 4, thereby gaining the access permission from the job cooperation server 4.

As described above, when the request for access is received from another device through the network 6, the job cooperation server 4 of the preferred embodiment determines whether or not to permit the received request for access depending on whether or not a qualified ticket issued by the authentication server 2 is attached. As the job cooperation server 4 gives the access permission based on the ticket, access to the job cooperation server 4 through the network 6 by each of the information processing device 3 and the image processing device 5 is enabled. The image processing device 5 produces print output based on the job data acquired from the job cooperation server 4, thereby executing a print job through cooperation with the job cooperation server 4.

The information processing device 3 has a configuration of, for example, a general personal computer (PC). In FIG. 1, the information processing device 3 is a dedicated device to be used by user A, for example. The information processing device 3 sends a request for authentication, which authentication information such as user ID and password entered by the user A attached to, to the authentication server 2. The information processing device 3 then acquires the underlying ticket corresponding to the user A from the authentication server 2 and stores the acquired underlying ticket. The underlying ticket corresponding to the user A is hold by the information processing device 3 until the information processing device 3 is turned off. The user A acquires the underlying ticket by making at least one operation to enter information such as user ID and password after turning on the information processing device 3. Thereafter, the user A is not required to enter information such as user ID and password until turning off the information processing device 3.

When transmitting the job data to the job cooperation server 4, the information processing device 3 uses the underlying ticket acquired in advance to acquire the ticket for the information processing device 3 to access the job cooperation server 4. The information processing device 3 transmits the job data to the job cooperation server 4 with the acquired ticket. After transmitting the job data to the job cooperation server 4, the information processing device 3 uses the underlying ticket acquired in advance and acquires the ticket for the image processing device 5 to access the job cooperation server 4 in place of the image processing device 5. The information processing device 3 then transmits the acquired ticket to the image processing device 5. The user A moves from the information processing device 3 to the image processing device 5 and makes operation to the image processing device 5 next. So, the job cooperation server 4 is accessed from the image processing device 5 with the ticket transmitted in advance to the image processing device 5, and is caused to execute the job based on the job data through cooperation with the image processing device 5. That is, the image processing system 1 of the preferred embodiment is so configured as not to generate access from the image processing device 5 to the authentication server 2. The details of the information processing device 3, the job cooperation server 4 and the image processing device 5 are explained next.

Figure 2:
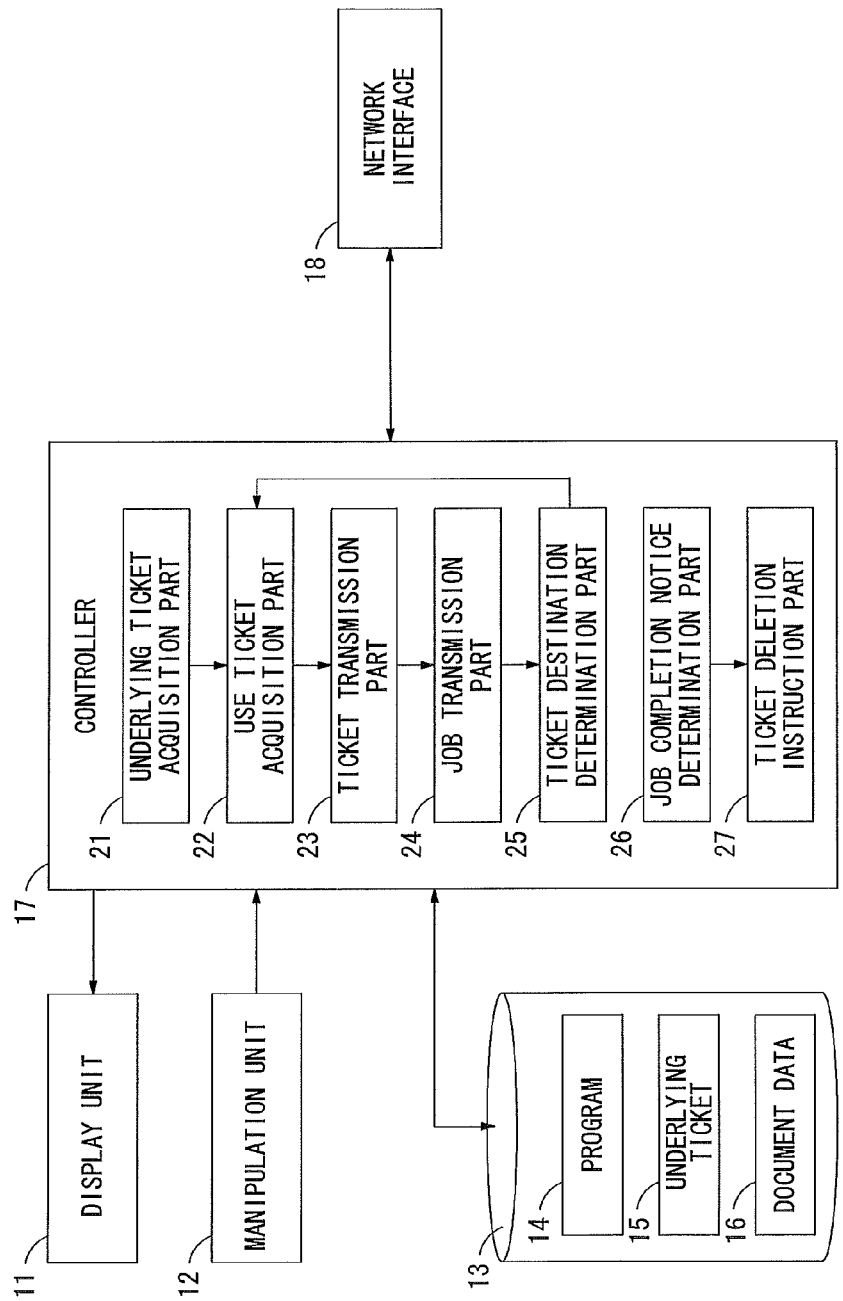
FIG. 2 is a block diagram showing the exemplary configuration of an information processing device.

The information processing device 3 is described in detail next. FIG. 2 is a block diagram showing the exemplary configuration of the information processing device 3. As shown in FIG. 2, the information processing device 3 includes a display unit 11, a manipulation unit 12, a storage device 13, a controller 17 and a network interface 18. The display unit 11 is formed from a device such as a liquid crystal display. The manipulation unit 12 is formed with parts such as a keyboard and a mouse. The storage device 13 is one kind of computer readable media. As for example, the storage device 13 is the one formed from a storage device such as a hard disk drive. The controller 17 is so configured as to include parts such as a CPU and a memory. The network interface 18 is to connect the information processing device 3 to the network 6.

The storage device 13 stores therein a program 14 executed by the CPU of the controller 17. The program 14 enables the job cooperation server 4 and the image processing device 5 to work together and execute the job. The program 14 is configured as, for instance, a printer driver. The storage device 13 also stores therein data such as an underlying ticket 15 acquired from the authentication server 2 and document data 16 subject of printing. The document data 16 of the preferred embodiment is, for example, highly-confidential document data. Also, when print output is produced in the image processing device 5, the job data is restricted from being transmitted directly from the information processing device 3 to the image processing device 5 in order for the document data 16 to be avoid from being browsed by a third person. So, for producing print output based on the document data 16, the information processing device 3 sets the print job as a cooperative job executed through cooperation between the job cooperation server 4 and the image processing device 5 and transmits the job data generated based on the document data 16 to the job cooperation server 4.

The CPU reads and executes the program 14 installed in the storage device 13, the controller 17 functions as an underlying ticket acquisition part 21, a use ticket acquisition part 22, a ticket transmission part 23, a job transmission part 24, a ticket destination determination part 25, a job completion notice determination part 26 and a ticket deletion instruction part 27.

In response to entry of the authentication information such as user ID and password through the manipulation unit 12, the underlying ticket acquisition part 21 sends the request for authentication, which the entered authentication information attached to, to the authentication server 2. The underlying ticket acquisition part 21 acquires the underlying ticket 15 corresponding to the user A from the authentication server 2. After acquiring the underlying ticket 15 from the authentication server 2, the underlying ticket acquisition part 21 stores the underlying ticket 15 thereby acquired in the storage device 13. The authentication information does not always have to be information such as user ID and password entered through the manipulation unit 12. The authentication information may be card information input by reading an IC card carried by the user A or biometric information input by reading a fingerprint, a vein pattern or the like of the user A, for example.

The use ticket acquisition part 22 reads the underlying ticket 15 stored in the storage device 13 and transmits the read underlying ticket 15 to the authentication server 2, thereby acquiring the ticket to use the job cooperation server 4. The use ticket acquisition part 22 not only acquires the ticket for the information processing device 3 to access the job cooperation server 4, but also acquires in place of the image processing device 5 the ticket for the image processing device 5 to access the job cooperation server 4.

It is assumed, for example, the user A makes operation to the manipulation unit 12, thereby designating the document data 16 and giving instructions to transmit the job data to the job cooperation server 4. In this case, the use ticket acquisition part 22 attaches the underlying ticket 15 and sends the request for issuance of the ticket for the information processing device 3 to use the job cooperation server 4 to the authentication server 2. So, the use ticket acquisition part 22 acquires the ticket for the information processing device 3 to use the job cooperation server 4 from the authentication server 2.

When acquiring the ticket for the image processing device 5 to access the job cooperation server 4, the use ticket acquisition part 22 attaches the underlying ticket 15 and designates that the image processing device 5 which performs data communication with the job cooperation server 4, and sends the request for issuance of the ticket to the authentication server 2. As a result, the use ticket acquisition part 22 acquires the ticket for the image processing device 5 to use the job cooperation server 4 from the authentication server 2.

The ticket transmission part 23 transmits the ticket acquired by the use ticket acquisition part 22 via the network interface 18. When the ticket for the information processing device 3 to use the job cooperation server 4 is acquired by the use ticket acquisition part 22, the ticket transmission part 23 transmits the acquired ticket to the job cooperation server 4. Also, when the ticket for the image processing device 5 to use the job cooperation server 4 is acquired by the use ticket acquisition part 22, the ticket transmission part 23 transmits the acquired ticket to the image processing device 5.

After the ticket is transmitted to the job cooperation server 4 by the ticket transmission part 23, the job transmission part 24 becomes operative to function when the access permission is received from the job cooperation server 4. The job transmission part 24 reads the document data 16 from the storage device 13, generates the job data based on the document data 16 and transmits the generated job data to the job cooperation server 4.

The ticket destination determination part 25 determines at least one image processing device 5 as a destination of the ticket from multiple image processing devices 5 (5a and 5b) connected to the network 6. The job cooperation server 4 receives the job data from the information processing device 3. In the preferred embodiment, in response to the receipt, the job cooperation server 4 transmits usage history information relating to the image processing device 5 which was caused to execute the job through cooperation with the job cooperation server 4 with instructions by the user A in the past to the information processing device 3. Based on the usage history information received from the job cooperation server 4, the ticket destination determination part 25 specifies a predetermined number (for example, approximately 2 to 3) of the image processing devices 5 frequently used by the user A from the multiple image processing devices 5 (5a and 5b) connected to the network 6. The predetermined number of the image processing devices 5 thereby specified are determined as the destination of the ticket. As described above, according to the preferred embodiment, the ticket destination determination part 25 determines at least one image processing device 5 to be the destination of the ticket from multiple image processing devices 5 (5a and 5b) connected to the network 5 automatically.

The destination of the ticket, however, is not limited to be determined automatically by the ticket destination determination part 25. By way of example, the ticket destination determination part 25 displays a list of the multiple image processing devices 5 in descending order of frequency in use by the user A on the display unit 11 based on the usage history information. The operation to select the image processing device 5 to be the destination of the ticket made by the user A is received through the manipulation unit 12. At least one image processing device 5 selected by the user A may be determined as the destination of the ticket.

As explained above, after determining at least one image processing device 5, the destination of the ticket, the ticket destination determination part 25 outputs a result of the determination to the use ticket acquisition part 22. The use ticket acquisition part 22 acquires the ticket for the image processing device 5 to access the job cooperation server 4 from the authentication server 2 based on the result of the determination by the ticket destination determination part 25. The ticket transmission part 23 transmits the ticket acquired by the use ticket acquisition part 22 to at least one image processing device 5 determined as the destination of the ticket, respectively.

In some cases, the ticket transmission part 23 transmits the ticket to the multiple image processing devices 5. With transmission in advance of the ticket to the multiple image processing devices 5, the user A is enabled to select one of the multiple image processing devices 5, the ticket transmitted to, and make execution of the job through cooperation with the job cooperation server 4. When, for example, the image processing device 5 the user A normally uses is being used by another user, the user A makes operation to another image processing device 5. So, the user A causes the image processing device 5 to cooperate with the job cooperation server 4 and execute the job immediately.

When transmitting the ticket to at least one image processing device 5, the ticket transmission part 23 specifies that the ticket is related to the user A and transmits the ticket. So, the image processing device 5 receives the ticket may determine that the ticket is related to which user.

In addition, when transmitting the ticket to at least one image processing device 5, the ticket transmission part 23 preferably transmits the ticket being encrypted with information such as the password designated by the user A. Therefore, the ticket transmitted to the image processing device 5 may be restricted from being used by a third person improperly.

According to the preferred embodiment, in response to completion of the execution of the job through cooperation between the job cooperation server 4 and the image processing device 5, a notice to notify the completion of the job (hereafter, job completion notice) is made from the job cooperation server 4 to the information processing device 3. The job completion notice determination part 26 illustrated in FIG. 2 determines the job completion notice. Based on the job completion notice received from the job cooperation server 4, the job completion notice determination part 26 specifies the image processing device 5 executed the job through cooperation with the job cooperation server 4. The ticket to access the job cooperation server 4 is sometimes transmitted to the multiple image processing devices 5 by the ticket transmission part 23. The job completion notice determination part 26 specifies the image processing device 5 executed the job through cooperation with the job cooperation server 4, thereby specifying the image processing device 5 which did not use the ticket of the multiple image processing devices 5, the ticket was transmitted to. The job completion notice determination part 26 instructs the image processing device 5 has the unused ticket to the ticket deletion instruction part 27.

The ticket deletion instruction part 27 sends an order to delete the ticket (hereafter, ticket deletion order) to the image processing device 5 which did not use the ticket even though the ticket is transmitted by the ticket transmission part 23, thereby deleting the unused ticket. Therefore, the unused ticket may be prevented from being remained stored in the image processing device 5 which did not use the ticket. Also, the unused ticket may be prevented from being used by a third person improperly.

Figure 3:
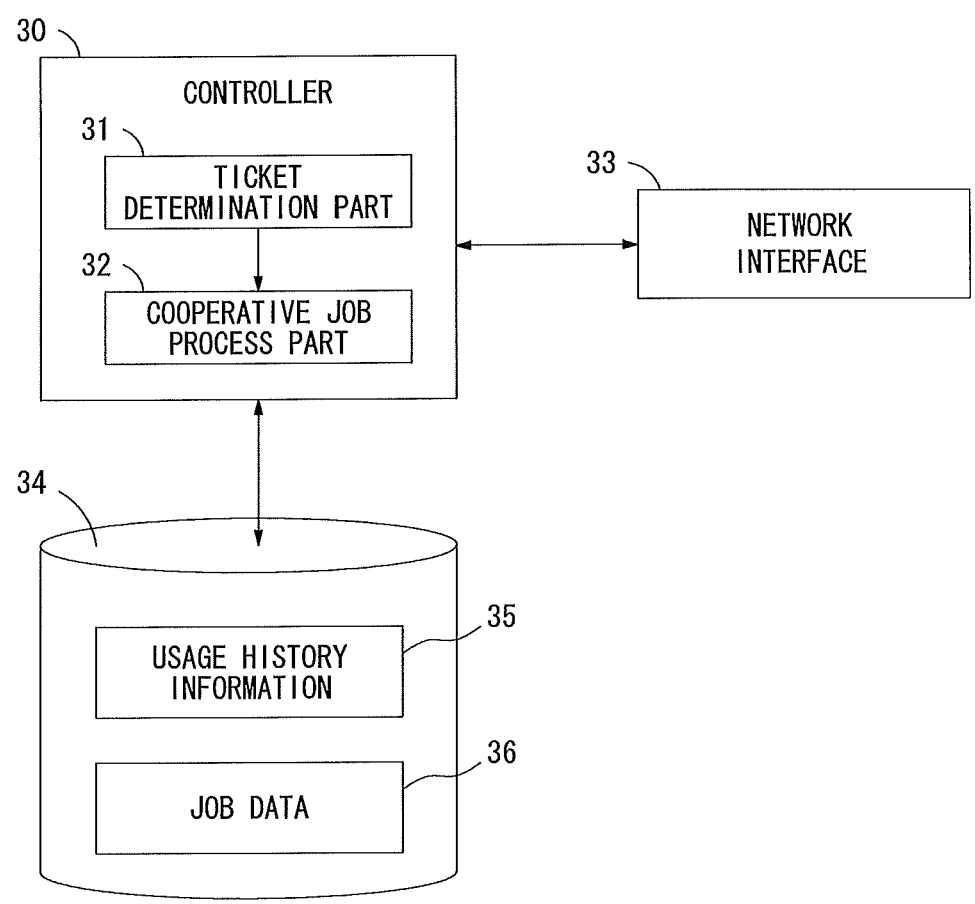
FIG. 3 is a block diagram showing the exemplary configuration of a job cooperation server.

The job cooperation server 4 is described in detail next. FIG. 3 is a block diagram showing the exemplary configuration of the job cooperation server 4. As shown in FIG. 3, the job cooperation server 4 includes a controller 30, a network interface 33 and the storage device 34. The controller 30 includes parts such as a CPU and a memory. The CPU executes a predetermined program. So, the controller 30 becomes operative to function as a ticket determination part 31 and a cooperative job process part 32. The network interface 33 connects the job cooperation server 4 to the network 6. The storage device 34 is formed from a storage device such as a hard disk drive. The storage device 34 stores therein usage history information 35 and job data 36 of each user.

The ticket determination part 31 determines whether or not the qualified ticket issued by the authentication server 2 is attached to the request for access to the job cooperation server 4 when receiving the request for access via the network interface 33. If the qualified ticket is attached to the request for access, the ticket determination part 31 sends the access permission to a source of the request for access via the network interface 33. The ticket determination part 31 determines the ticket attached to the request for access, thereby specifying that the ticket is related to the user A. If the qualified ticket is not attached to the request for access, the ticket determination part 31 does not send the access permission.

The cooperative job process part 32 performs data communication via the network interface 33 with the destination that the ticket determination part 31 permits the job cooperation server 4 to be accessed by (the information processing device 3 and the image processing device 5), thereby executing a process required for execution of the job through cooperation with the image processing device 5. In response to the receipt of the job data 36 from the information processing device 3, for example, the cooperative job process part 32 stores the received job data 36 in the storage device 34. The cooperative job process part 32 stores the job data 36 in the storage device 34 as a job related to the user A. The cooperative job process part 32 reads the usage history information 35 related to the user A stored in the storage device 34, and transmits the read usage history information 35 to the information processing device 3. As a result, the information processing device 3 is allowed to determine at least one image processing device 5 frequently used by the user A as a destination of the ticket based on the usage history information 35 as described above.

When receiving a request for transmission of the job data 36 from the image processing device 5, the cooperative job process part 32 reads the job data 36 stored in the storage device 34, and transmits the read job data 36 to the image processing device 5. In response to completion of the job through cooperation with the image processing device 5, the cooperative job process part 32 updates the usage history information 35 and sends the job completion notice to the information processing device 3. The job completion notice thereby sent includes information related to one image processing device 5, the destination of the job data 36. So, the information processing device 3 is allowed to specify the image processing device 5 executed the job through cooperation with the job cooperation server 4 based on the job completion notice as described above. In addition, the information processing device 3 is allowed to specify at least one image processing device 5 which did not use the ticket.

Figure 4:
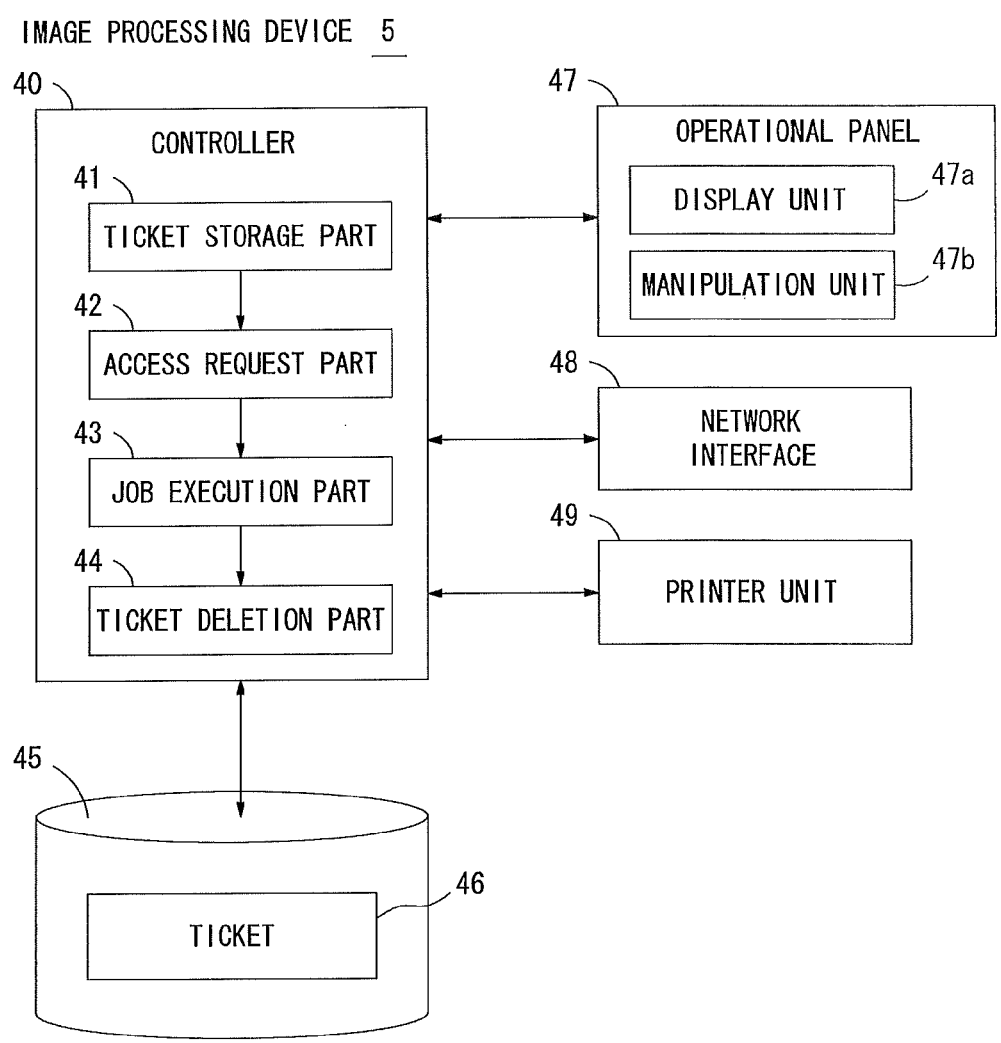
FIG. 4 is a block diagram showing the exemplary configuration of an image processing device.

The image processing device 5 is described in detail next. FIG. 4 is a block diagram showing the exemplary configuration of the image processing device 5. As shown in FIG. 4, the image processing device 5 includes a controller 40, a storage device 45, an operational panel 47, a network interface 48 and a printer unit 49. The image processing device 5 also includes other parts such as a scanner unit and a fax transmission and reception unit besides above-listed parts. The other parts, however, are not shown in FIG. 4.

The controller 40 includes parts such as a CPU and a memory. The CPU executes a predetermined program. The controller 40 becomes operative to function as variety of processing parts. Some of the processing parts as an example are a ticket storage part 41, an access request part 42, a job execution part 43 and a ticket deletion part 44 as illustrated in FIG. 4. The storage device 45 is formed from a storage device such as a hard disk drive. The storage device 45 stores therein a ticket 46 acquired by the information processing device 3 and received from the same. The ticket 46 is a ticket for the image processing device 5 to access the job cooperation server 4. The operational panel 47 is a user interface when the user A makes operation to the image processing device 5. The operational panel 47 includes a display unit 47a and a manipulation unit 47b. The network interface 48 connects the image processing device 5 to the network 6. The printer unit 49 is controlled to drive by the controller 40. The printer unit 49 is so configured as to produce print output based on the job data.

The ticket storage part 41 of the controller 40 stores the ticket 46 received from the information processing device 3 in the storage device 45. The ticket 46 received by the image processing device 5 from the information processing device 3 includes information to identify the user. The ticket storage part 41 stores the ticket 46 received from the information processing device 3 with associating with the user in the storage device 45. In the preferred embodiment, the ticket 46 is stored in the storage device 45 as the ticket related to the user A.

The operational panel 47 is operated by the user A and the image processing device 5 is logged in by the user A. The instruction for execution of the job through cooperation with the job cooperation server 4 is then given by the user A, and the access request part 42 reads the ticket 46 related to the user A stored in the storage device 45. The access request part 42 sends the request for access, the ticket 46 thereby read attached, to the job cooperation server 4. When the ticket 46 is encrypted with information such as a password, a screen prompting entry of the information such as the password is displayed on the display unit 47a. The ticket 46 is decrypted with the information such as the password entered through the manipulation unit 47b. The ticket 46 thereby decrypted is transmitted to the job cooperation server 4. As described above, after the access request part 42 attaches the ticket 46 and sends the request for access, the job execution part 43 becomes operative to function if the access permission is received from the job cooperation server 4.

The job execution part 43 cooperates with the job cooperation server 4 and executes the job. The job execution part 43 sends the request for transmission of the job data 36 to the job cooperation server 4. The job cooperation server 4 transmits the job data 36 to the image processing device 5. After receiving the job data 36 from the job cooperation server 4, the job execution part 43 outputs the received job data 36 to the printer unit 49 and drives the printer unit 49. The printer unit 49 becomes operative to produce print output based on the job data 36. As explained above, the execution of the job through cooperation between the image processing device 5 and the job cooperation server 4 is complete.

The ticket deletion part 44 deletes the ticket 46 stored in the storage device 45. The ticket 46 is deleted from the storage device 45 by the ticket deletion part 44 at time of being read and used or at time of completion of the execution of the job by the job execution part 43. Even if the ticket 46 has not been used, the ticket deletion part 44 deletes the ticket 46 ordered with the ticket deletion order from the storage device 45 in response to the ticket deletion order received from the information processing device 3. Therefore, the used ticket 46 and the unused ticket 46 may be prevented from being remained stored in the storage device 45 for a long time.

Figure 5:
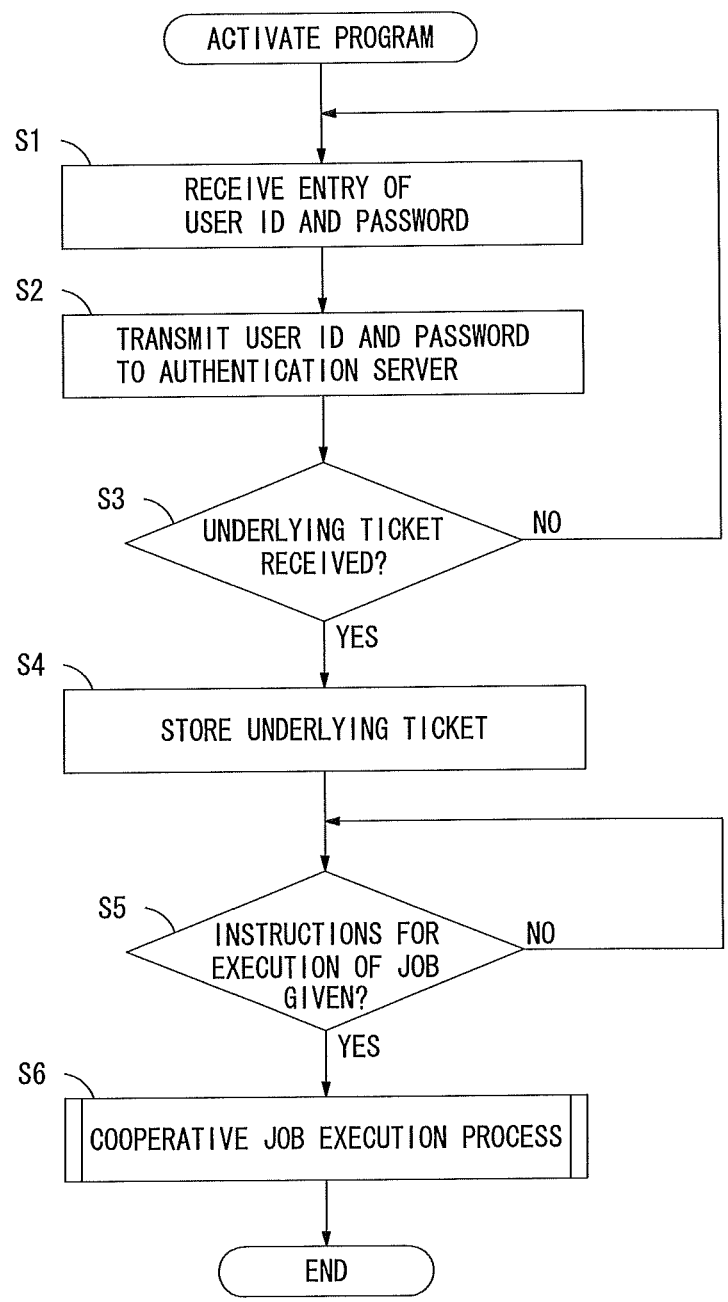
FIG. 5 is a flow diagram explaining an exemplary process sequence executed by a controller in the information processing device.
Figure 6:
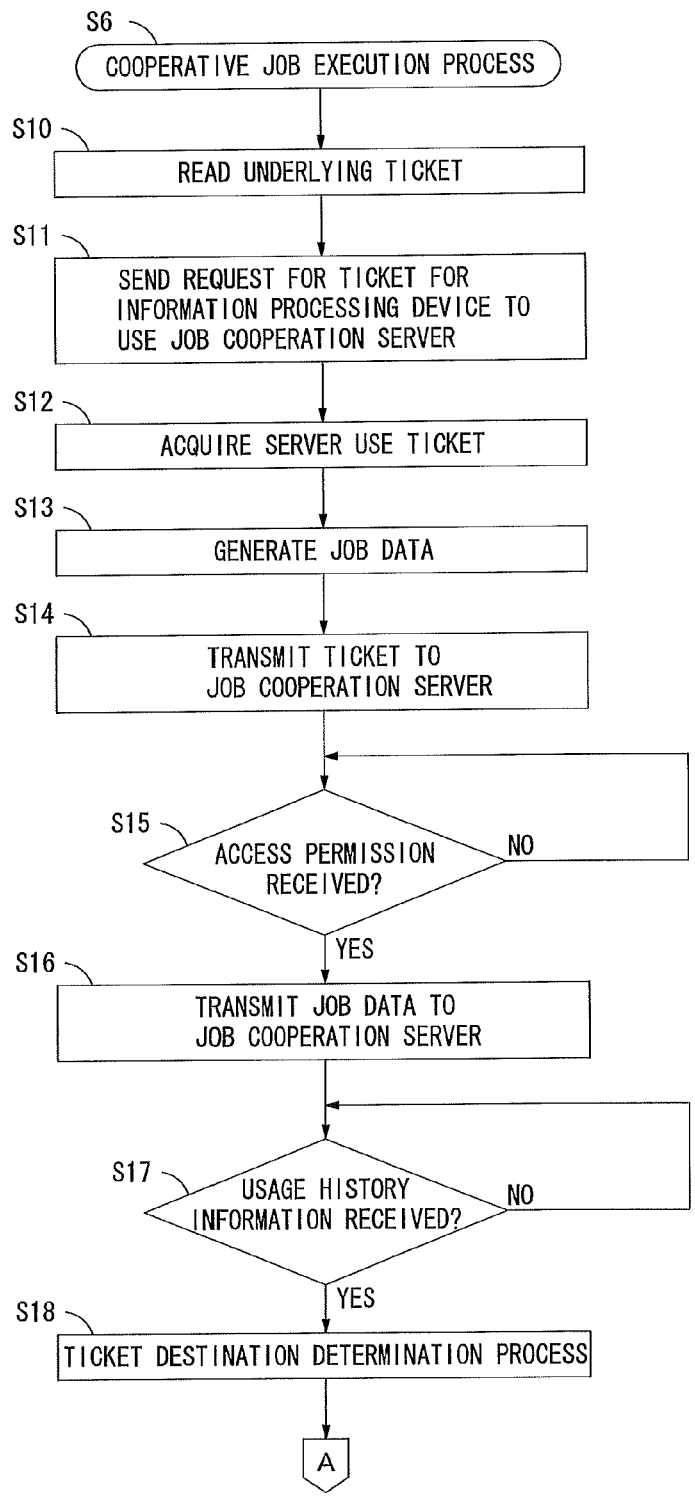
FIGS. 6 and 7 are flow diagrams explaining an exemplary procedure of a cooperative job execution process in detail.
Figure 7:
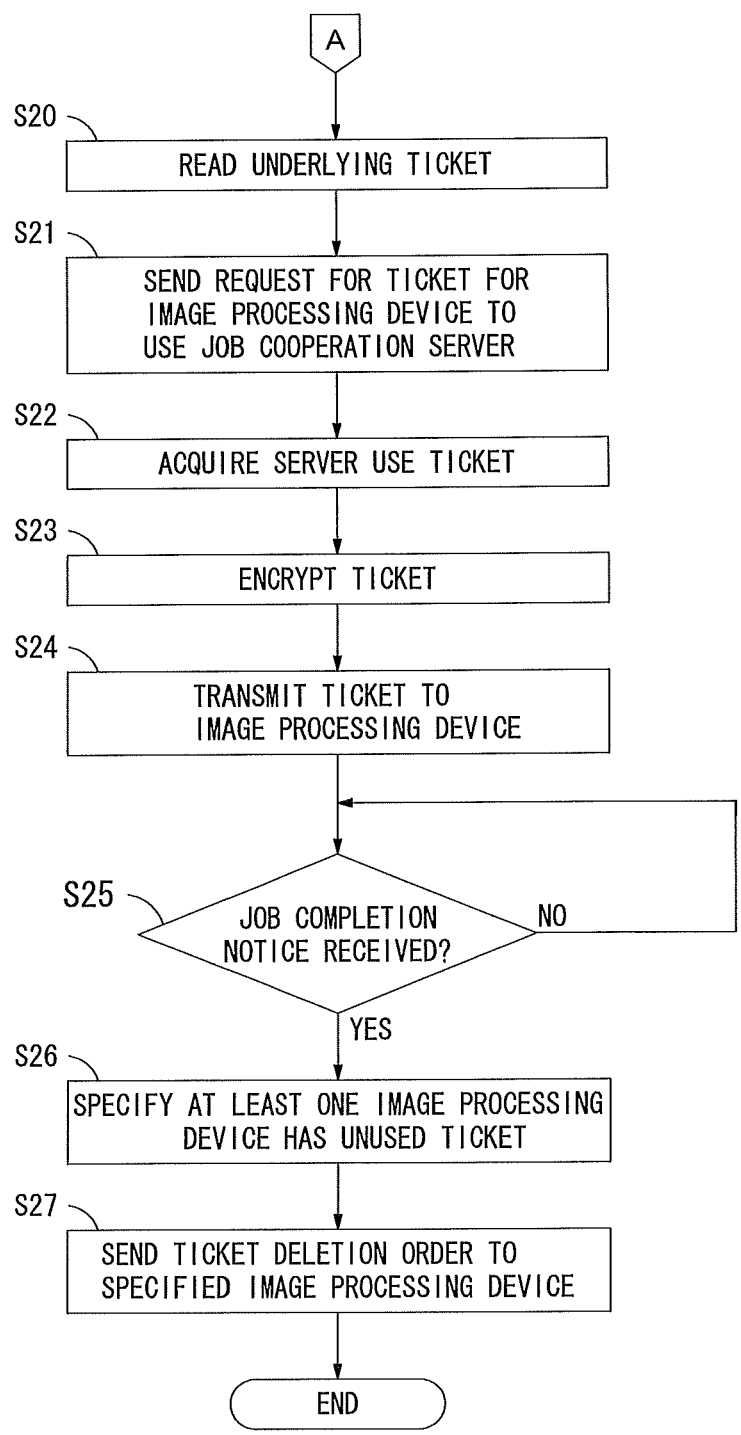

Next, an example of the operation of the information processing device 3 is described. FIGS. 5 to 7 are flow diagrams explaining an exemplary process sequence executed by the controller 17 in the information processing device 3. The process is started by activation of the program 14 by the CPU in the controller 17.

As shown in FIG. 5, in response to start of the process, the controller 17 receives entry of user ID and password through the manipulation unit 12 (step S1). The controller 17 transmits the user ID and password entered with operation to the manipulation unit 12 by the user A to the authentication server 2 (step S2). After transmission, the controller 17 determines whether or not the underlying ticket 15 is received from the authentication server 2 (step S3). The process moves to step S4 when the underlying ticket 15 is received. When the underlying ticket 15 is not received, the controller 17 returns to step S1 to receive the operation to entry user ID and password.

In response to the receipt of the underlying ticket 15 from the authentication server 2, the controller 17 stores the received underlying ticket in the storage device 13 (step S4). The controller 17 is then put into a waiting state until the instructions for execution of the job are given by the user A (step S5). The job specified by the user A here is a job executed through cooperation between the job cooperation server 4 and the image processing device 5. When the instructions for execution of the job are given by the user A, the controller 17 executes a cooperative job execution process (step S6).

FIGS. 6 and 7 are flow diagrams explaining an exemplary procedure of the cooperative job execution process (step S6) in detail. After the instructions for execution of the cooperative job are given, the controller 17 first reads the underlying ticket 15 stored in the storage device 13 (step S10). The controller 17 attaches the read underlying ticket 15 and sends the request for issuance of the ticket for the information processing device 3 to use the job cooperation server 4 to the authentication server 2 (step S11). The controller 17 acquires the ticket for the information processing device 3 to use the job cooperation server 4 from the authentication server 2 (step S12). The controller 17 reads the document data 16 stored in the storage device 13, and generates the job data 36 based on the read document data 16 (step S13).

The controller 17 next transmits the ticket acquired in step S12 to the job cooperation server 4 (step S14), and is put into a waiting state until receiving the access permission from the job cooperation server 4 (step S15). After receiving the access permission from the job cooperation server 4 (when a result of step S15 is YES), the controller 17 transmits the job data 36 generated in step S13 to the job cooperation server 4 (step S16).

The controller 17 is put into a waiting state until receiving the usage history information 35 from the job cooperation server 4 (step S17). In response to receipt of the usage history information 35, the controller 17 determines at least one image processing device 5 to be the destination of the ticket based on the usage history information 35 (step S18). The process continues to the flow diagram of FIG. 7.

The controller 17 reads the underlying ticket 15 stored in the storage device 13 (step S20), and attaches the underlying ticket 15 and sends the request for issuance of the ticket for the image processing device 5 determined in step S18 to use the job cooperation server 4 to the authentication server 2 (step S21). As a result, the controller 17 acquires the ticket 46 for the image processing device to use the job cooperation server 4 from the authentication server 2 (step S22). The controller 17 encrypts the ticket 46 to transmit to the image processing device 5 (step S23), and transmits the encrypted ticket 46 to at least one image processing device 5 determined in step S18, respectively (step S24).

The user A thereafter moves from the information processing device 3 to the image processing device 5. The user A makes operation to the image processing device 5 and gives the instructions for execution of the job through cooperation with the job cooperation server 4.

On the other hand, the controller 17 is put into a waiting state to receive the job completion notice from the job cooperation server 4 after transmission (step S25). After receiving the job completion notice, the controller 17 specifies at least one image processing device 5 has the unused ticket based on the received job completion notice (step S26). The controller 17 sends the ticket deletion order to the image processing device 5 specified in step S26 (step S27). When the image processing device 5 has unused ticket cannot be specified in step S26 (to be more specific, when the ticket 46 is transmitted to only one image processing device 5), the process in step S27 is not executed. A sequence of the process in the information processing device 3 is complete.

Figure 8:
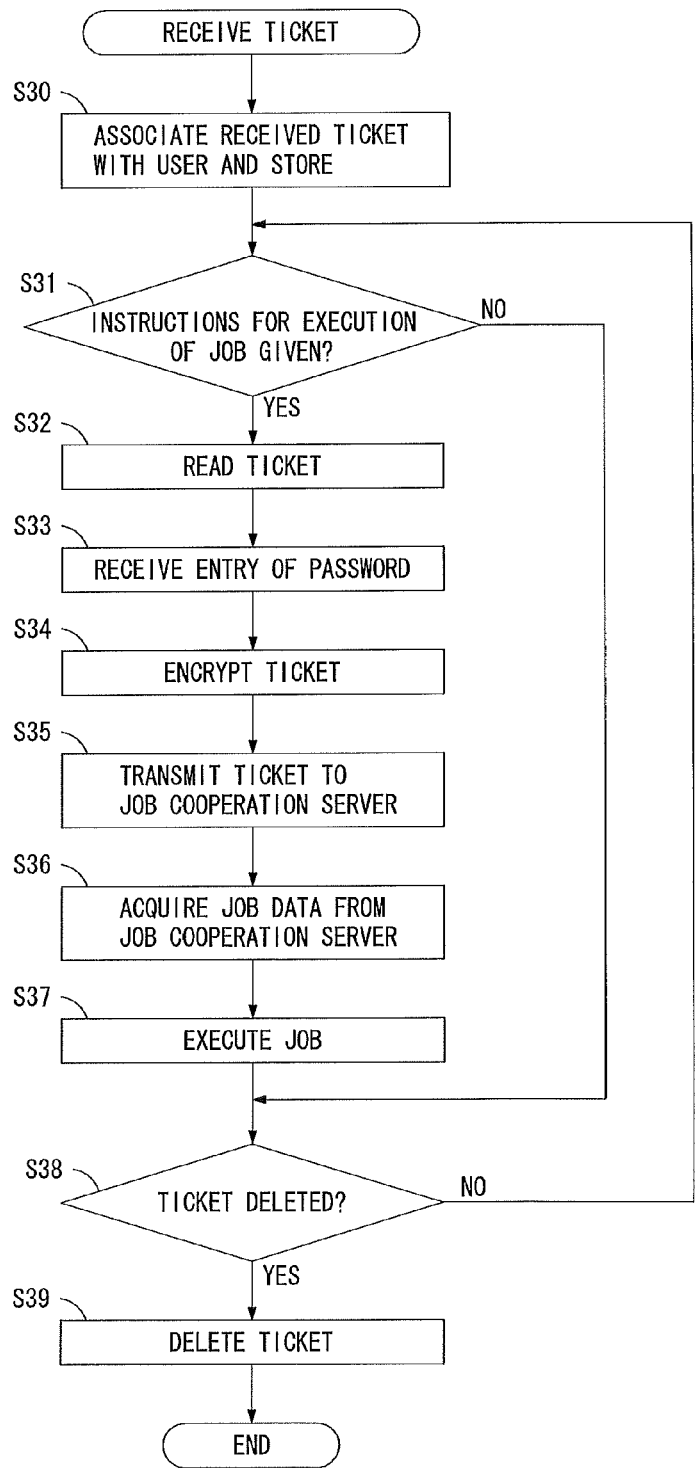
FIG. 8 is a flow diagram explaining an exemplary process sequence executed by a controller in the image processing device.

Next, an example of the operation of the image processing device 5 is described. FIG. 8 is a flow diagram explaining an exemplary process sequence executed by the controller 40 in the image processing device 5. The process is started in response to receipt of the ticket 46 by the controller 40 from the information processing device 3.

In response to start of the process, the controller 40 associates the ticket 46 received from the information processing device 3 with the user A and stores in the storage device 45 (step S30). The controller 40 then determines whether or not the instructions for execution of the job are given by the user A with operation to the operational panel 47 (step S31).

When the instructions for execution of the job are given by the user A (when a result of step S31 is YES), the controller 40 reads the ticket 46 stored in the storage device 45 (step S32). The controller 40 receives the operation to enter password made by the user A (step S33), and decrypts the ticket 46 based on the entered password (step S34). The controller 40 transmits the ticket 46 thereby decrypted to the job cooperation server 4, thereby sending the request for access to the job cooperation server 4 (step S35). If the access permission is received from the job cooperation server 4, the controller 40 acquires the job data 36 from the job cooperation server 4 (step S36). The controller 40 executes the job based on the acquired job data 36 (step S37), and continues to step S38. If the instructions for execution of the job are not given by the user A (when a result of step S31 is NO), the controller 40 skips the process in above-described steps S32 to S37 and continues to step S38.

In step S38, the controller 40 determines whether or not to delete the ticket 46 stored in the storage device 45. The ticket 46 is determined to be deleted (so the result is YES) when the ticket 46 has already been used or when the ticket deletion order is received from the information processing device 3. When determining not to delete the ticket 46, the controller 40 returns to step S31. The same determination is repeatedly made until the instructions for execution of the job are given by the user A or the ticket deletion order is received from the information processing device 3. When determining to delete the ticket (when a result of step S38 is YES), the controller 40 deletes the ticket 46 stored in the storage device 45 and completes the process.

Next, a flow of data communication between each devices when a job is executed through cooperation between the job cooperation server 4 and the image processing device 5 in the image processing system 1 configured as described above. FIG. 9 shows the flow of data communication in the image processing system 1. The number provided in parentheses in FIG. 9 shows the sequence of data communication. As illustrated in FIG. 9, (1) the information processing device 3 transmits the authentication information including user ID and password to the authentication server 2. (2) The authentication server 2 executes user authentication. When the authentication results in success, the authentication server 2 transmits the underlying ticket 15 to the information processing device 3. The underlying ticket 15 is hold by the information processing device 3. If the information processing device 3 is thereafter instructed by the user A to execute the job with the job cooperation server 4, (3) the information processing device 3 sends the request for the ticket for the information processing device 3 to use the job cooperation server 4 and the underlying ticket 15 to the authentication server 2. (4) The authentication server 2 issues the ticket for the information processing device 3 to use the job cooperation server 4 based on the received underlying ticket 15 and transmits to the information processing device 3. (5) The information processing device 3 transmits the ticket acquired from the authentication server 2 to the job cooperation server 4. (6) In response to the receipt of the ticket, the job cooperation server 4 sends the access permission to the information processing device 3. (7) The information processing device 3 transmits the job data 36 to the job cooperation server 4. (8) After receiving the job data 36, the job cooperation server 4 transmits the usage history information 35 to the information processing device 3. The information processing device 3 determines at least one image processing device 5 to be the destination of the ticket based on the received usage history information 35. (9) The information processing device 3 sends the request for the ticket for the image processing device 5 to use the job cooperation server 4 and the underlying ticket 15 to the authentication server 2. (10) The authentication server 2 issues the ticket 46 for the image processing device 5 to use the job cooperation server 4 based on the received underlying ticket 15, and transmits the ticket 46 to the information processing device 3. (11) The information processing device 3 transmits the ticket 46 received from the authentication server 2 to the image processing device 5. The ticket 46 thereby transmitted is hold by the image processing device 5.

The user A moves to the front of the image processing device 5 and makes operation to the operational panel 47, thereby giving the instructions for execution of the job through cooperation with the job cooperation server 4. (12) The image processing device 5 then transmits the ticket 46 to the job cooperation server 4. (13) After receiving the ticket 46, the job cooperation server 4 sends the access permission to the image processing device 5. Based on the request for transmission of the job data from the image processing device 5, (14) the job cooperation server 4 transmits the job data 36 to the image processing device 5. The print job based on the job data 36 is executed in the image processing device 5.

After execution of the print job, (15) the job cooperation server 4 specifies one image processing device 5 executed the print job and sends the job completion notice to the information processing device 3. However, the process after sending the notice is not shown in FIG. 9, the information processing device 3 thereafter sends the ticket deletion order to at least one image processing device 5 has unused ticket 46 therein, and the image processing device 5 received the ticket deletion order deletes the unused ticket 46.

As explained above, the image processing system 1 of the preferred embodiment is so configured as to acquire the underlying ticket 15 from the authentication server 2 only by the information processing device 3. The information processing device 3 acquires the ticket 46 for the image processing device 5 to use the job cooperation server 4 from the authentication server 2, and transmits the acquired ticket 46 to at last one image processing device 5. The image processing device 5 accesses the job cooperation server 4 with the ticket 46 acquired from the information processing device 3, thereby executing the job through cooperation with the job cooperation server 4. According to the image processing system 1 of the preferred embodiment, the underlying ticket is not remained stored in the image processing device 5. Even if the user uses the image processing device 5 is replaced frequently, the underlying ticket corresponding to the respective users may effectively be prevented from being used by a third person improperly.

It is assumed that the operational panel 47 of the image processing device 5 is operated by the user A, and the job is executed through cooperation between the image processing device 5 and the job cooperation server 4. In this case, in the image processing system 1 of the preferred embodiment, the image processing device 5 has already hold the ticket 46 for the image processing device 5 to use the job cooperation server 4 when the job is caused to be executed. Therefore, as the instructions for execution of the job are given by the user A, the image processing device 5 is allowed to access the job cooperation server 4 immediately. Time to start of execution of the job required in the image processing device 5 may be shorten compared to conventionally used image processing devices.

The authentication information such as user ID and password is not transmitted to the authentication server 2 when the user A makes operation to the image processing device 5. Therefore, the load placed on the authentication server 4 may be reduced. Additionally, when the user A moves from the information processing device 3 to the image processing device 5, he or she is not necessary to carry a device such as a removable medium. The high convenience is realized.

As described above, the image processing system 1 of the preferred embodiment allows execution of the job through cooperation between the image processing device and the job cooperation server to be started rapidly, and also allows improvement of security and convenience of the image processing device.

As explained above, the ticket for the image processing device to use the job cooperation server may be acquired from the authentication server by the information processing device. The acquired ticket is transmitted to the image processing device by the information processing device. So, the image processing device is capable of accessing the job cooperation server with the ticket received from the information processing device and executing the job through cooperation with the job cooperation server. The request for authentication is not sent to the authentication server from the image processing device. So, the load placed on the authentication server may be reduced. Also, the execution of the job through cooperation between the image processing device and the job cooperation server is caused to be started immediately. As a result, the security and convenience of the image processing device are allowed to be improved.

(Modifications)

While the preferred embodiment of the present invention has been described above, the present invention is not limited to the preferred embodiment. Various modifications may be applied to the present invention.

By way of example, according to the preferred embodiment described above, a series of operation is executed with transmission of the job data 36 to the job cooperation server 4 by the information processing device 3. The series of operation is to acquire the ticket 46 for the image processing device 5 to use the job cooperation server 4 from the authentication server 2 and transmits the ticket 46 to the image processing device 5. The present invention, however, is not limited to the preferred embodiment. As one of examples, the request for acquisition of the ticket may be sent from the image processing device 5 to the information processing device 3 in response to the operation made by the user A to the image processing device 5. The information processing device 3 may acquire the ticket 46 for the image processing device 5 to use the job cooperation server 4 from the authentication server 2 when receiving the request for acquisition of ticket from the image processing device 5. The flow of data communication between each device for the case of example is described next.

FIG. 10 shows another flow of data communication in the image processing system 1. The numbers provided in parentheses in FIG. 10 show the sequence of data communication. As illustrated in FIG. 10, the underlying ticket 15 corresponding to the user A is stored in advance in the storage device 13 of the information processing device 3. The job data 36 is stored in advance in the storage device 34 of the job cooperation server 4. In such a condition, the user A makes operation to the operational panel 47 of the image processing device 5, thereby realizing access to the job cooperation server 4 and giving instructions for execution of the print job based on the job data 36. (1) The image processing device 5 sends the request for acquisition of the ticket 46 for the image processing device 5 to use the job cooperation server 4 to the information processing device 3. (2) After receiving the request for acquisition of ticket, the information processing device 3 sends the request for the ticket for the image processing device 5 to use the job cooperation server 4 and the underlying ticket 15. (3) The authentication server 2 issues the ticket 46 for the image processing device 5 to use the job cooperation server 4 based on the received underlying ticket 15 and transmits the issued ticket 46 to the information processing device 3. (4) The information processing device 3 transmits the ticket 46 acquired from the authentication server 2 to the image processing device 5. In this example, the information processing device 3 transmits the ticket 46 to only one image processing device 5 sent the request for acquisition of ticket. (5) The image processing device 5 transmits the ticket 46 to the job cooperation server 4. (6) In response to receipt of the ticket 46, the job cooperation server 4 sends the access permission to the image processing device 5. Based on the request for transmission of the job data from the image processing device 5, (7) the job cooperation server 4 transmits the job data 36 to the image processing device 5. The print job based on the job data 36 is executed in the image processing device 5.

For the case of FIG. 10, the image processing device 5 is operated by the user A, and the operation to acquire the ticket 46 is started. So, a certain time to start of the execution of the job is required in the image processing device 5. On the other hand, the underlying ticket is not remained in the image processing device 5. The underlying ticket may be prevented from being used by a third person improperly. When the user A makes operation to the image processing device 5, he or she is not necessary to enter the authentication information such as user ID and password for user authentication in the authentication server 2. Moreover, the user A is not required to carry the device such as the removable medium. The system having high convenience may be realized.

For the case described above, the print job is stated as one of examples of the job executed through cooperation between the image processing device 5 and the job cooperation server 4. The job is not limited to the print job, however. As other examples, a fax job or a scan job may be executed through cooperation between the image processing device 5 and the job cooperation server 4. Alternatively, processing such as image processing which is not installed in the image processing device 5 may be executed by the job cooperation server 4.

While the invention has been shown and described in detail, the foregoing description is in all aspects illustrative and not restrictive. It is therefore understood that numerous modifications and variations can be devised without departing from the scope of the invention.

What is claimed is:

1. An image processing system comprising:
  a job cooperation server for executing a predetermined processing for execution of a job;
  an image processing device for cooperating with said job cooperation server and executing the job;
  an authentication server for executing user authentication and issuing an underlying ticket corresponding to a user and for issuing a ticket to use said job cooperation server based on said underlying ticket; and
  an information processing device for acquiring and storing said underlying ticket by sending a request for authentication to said authentication server based on authentication information entered by the user and for acquiring said ticket to use said job cooperation server from said authentication server with said underlying ticket, wherein
  said information processing device acquires said ticket for said image processing device to use said job cooperation server from said authentication server with said underlying ticket and transmits said ticket to said image processing device,
  said image processing device accesses said job cooperation server with said ticket acquired from said information processing device and executes the job through cooperation with said job cooperation server,
  a plurality of said image processing devices are connected through a network,
  said information processing device determines a predetermined number of image processing devices as destinations of said ticket from said plurality of image processing devices based on usage history of said plurality of image processing devices, and transmits said ticket for using said job cooperation server to said predetermined number of image processing devices, respectively,
  said job cooperation server sends a job completion notice indicating completion of execution of the job through cooperation with one of said predetermined number of image processing devices to said information processing device in response to completion of execution of the job through cooperation with said one image processing device, and
  said information processing device sends a ticket deletion order to other image processing devices besides said one image processing device of said predetermined number of image processing devices based on said job completion notice, thereby causing the ticket transmitted to said other image processing devices to be deleted.

2. An information processing device connected with each of a job cooperation server for executing a predetermined processing for execution of a job, an image processing device for cooperating with said job cooperation server and executing the job and an authentication server for executing user authentication and issuing an underlying ticket corresponding to a user and for issuing a ticket to use said job cooperation server based on said underlying ticket through a network, said information processing device comprising:
  an underlying ticket acquisition part for acquiring said underlying ticket from said authentication server by sending a request for authentication attaching authentication information to said authentication server;
  a storage part for storing therein said underlying ticket acquired by said underlying ticket acquisition part;
  a use ticket acquisition part for acquiring said ticket for said image processing device to use said job cooperation server from said authentication server by transmitting said underlying ticket stored in said storage part to said authentication server; and
  a ticket transmission part for making said job cooperation server available for said image processing device by transmitting said ticket acquired by said use ticket acquisition part to said image processing device, wherein
  a plurality of said image processing devices are connected through said network, and
  said information processing device, further comprising a ticket destination determination part for determining a predetermined number of image processing devices as destinations of said ticket from said plurality of image processing devices based on usage history of said plurality of image processing devices, wherein
  said ticket transmission part transmits said ticket acquired by said use ticket acquisition part to said predetermined number of image processing devices, respectively, and
  said information processing device, further comprising:
  a receipt part for receiving a job completion notice indicating completion of execution of the job through cooperation between one of said predetermined number of image processing devices and said job cooperation server; and
  a ticket deletion order part for causing said ticket transmitted to other image processing devices besides said one image processing device of said predetermined number of image processing devices deleted by sending a ticket deletion order to said other image processing devices based on said job completion notice.

3. A non-transitory computer readable medium on which a program is stored, said program to be executed by an information processing device with which each of a job cooperation server for executing a predetermined processing necessary for execution of a job, an image processing device for cooperating with said job cooperation server and executing the job and an authentication server for executing user authentication and issuing an underlying ticket corresponding to a user and for issuing a ticket to use said job cooperation server based on said underlying ticket is connected through a network, said program causing said information processing device to execute processing comprising the steps of:

(a) acquiring said underlying ticket from said authentication server by sending a request for authentication attaching authentication information to said authentication server;
(b) storing said underlying ticket acquired in said step (a) in a predetermined storage part;
(c) acquiring said ticket for said image processing device to use said job cooperation server from said authentication server by transmitting said underlying ticket stored in said storage part to said authentication server; and
(d) making said job cooperation server available for said image processing device by transmitting said ticket acquired in said step (c) to said image processing device, wherein a plurality of said image processing devices are connected through said network, and said program causing said information processing device to execute processing, further comprising the step of:
(e) determining a predetermined number of image processing devices as destinations of said ticket from said plurality of image processing devices based on usage history of said plurality of image processing devices, wherein in said step (d), said ticket acquired in said step (c) is transmitted to said predetermined number of image processing devices, respectively, and wherein said program causing said information processing device to execute processing, further comprising the steps of:
(f) receiving a job completion notice indicating completion of execution of the job through cooperation between one of said predetermined number of image processing devices and said job cooperation server; and
(g) causing said ticket transmitted to other image processing devices besides said one image processing device of said predetermined number of image processing devices deleted by sending a ticket deletion order to said other image processing devices based on said job completion notice.

4. A job execution method employed in an image processing system comprising a job cooperation server for executing a predetermined processing necessary for execution of a job, an image processing device for cooperating with said job cooperation server and executing the job, an authentication server for executing user authentication and issuing an underlying ticket corresponding to a user and for issuing a ticket to use said job cooperation server based on said underlying ticket and an information processing device for acquiring said ticket to use said job cooperation server from said authentication server, each of which connected through a network, said job execution method comprising the steps of:
(a) acquiring and storing said underlying ticket from said authentication server with sending of a request for authentication attaching authentication information to said authentication server by said information processing device;
(b) sending a request for issuance of said ticket for said image processing device to use said job cooperation server with said underlying ticket from said information processing device to said authentication server;
(c) transmitting said ticket for said image processing device to use said job cooperation server from said authentication server to said information processing device based on said request for issuance of ticket;
(d) transmitting said ticket acquired from said authentication server to said image processing device by said information processing device, respectively;
(e) storing said ticket received by said image processing device in a predetermined storage part; and
(f) accessing said job cooperation server by said image processing device with said ticket stored in said storage part, and executing the job through cooperation with said job cooperation server, wherein a plurality of said image processing devices are connected through said network, and in said step (d), a predetermined number of image processing devices are determined as destinations of said ticket from said plurality of image processing devices based on usage history of said plurality of image processing devices, and said ticket is transmitted to said predetermined number of image processing devices, the job execution method further comprising the steps of:
(g) receiving a job completion notice indicating completion of execution of the job through cooperation between one of said predetermined number of image processing devices and said job cooperation server by said information processing device; and
(h) causing said ticket transmitted to other image processing devices besides said one image processing device of said predetermined number of image processing devices deleted with sending of a ticket deletion order to said other image processing devices based on said job completion notice by said information processing device.

5. The image processing system according to claim 1, wherein said information processing device acquires, from said authentication server, said underlying ticket and said ticket for said information processing device to use said job cooperation server and transmit job data to said job cooperation server.

6. The information processing device according to claim 2, further comprising:
an acquisition part for acquiring, from said authentication server, said ticket for said information processing device to use said job cooperation server by transmitting said underlying ticket stored in said storage part to said authentication server, and
a transmission part for accessing said job cooperation server with said ticket acquired by said acquisition part, and transmitting job data to said job cooperation server.

7. The non-transitory computer readable medium according to claim 3, wherein said program causes said information processing device to execute processing, further comprising the steps of:
(h) acquiring said ticket from said authentication server for said information processing device to use said job cooperation server by transmitting said underlying ticket stored in said storage part to said authentication server; and
(i) accessing said job cooperation server with said ticket acquired in said step (h), and transmitting job data to said job cooperation server.

8. The job execution method according to claim 4, further comprising the steps of:
(i) sending a request from said information processing device to said authentication server for issuance of said underlying ticket and said ticket for said information processing device to use said job cooperation server; and
(j) accessing said job cooperation server with said ticket acquired in said step (i), and transmitting job data to said job cooperation server.

* * * * *